United States Patent [19]

Moore

[11] 4,287,532
[45] Sep. 1, 1981

[54] IMAGE-SHEARING APPARATUS

[75] Inventor: Derek S. Moore, York, England

[73] Assignee: Vickers Limited, London, England

[21] Appl. No.: 85,067

[22] Filed: Oct. 15, 1979

[30] Foreign Application Priority Data

Oct. 27, 1978 [GB] United Kingdom ............... 42156/78

[51] Int. Cl.³ .............................................. H04M 7/18
[52] U.S. Cl. .................................. 358/107; 356/381; 356/384
[58] Field of Search ....................... 358/107, 101, 100; 364/550; 356/372, 375, 379, 381, 384; 209/939

[56] References Cited

U.S. PATENT DOCUMENTS

| | | | |
|---|---|---|---|
| 3,578,906 | 5/1971 | Holmstrom | 358/107 |
| 3,678,192 | 7/1972 | Akuta | 358/107 |
| 3,679,820 | 7/1972 | Montone | 358/107 |
| 3,829,609 | 8/1974 | Payne | 358/107 |

Primary Examiner—Robert L. Griffin
Assistant Examiner—Edward L. Coles
Attorney, Agent, or Firm—Browdy and Neimark

[57] ABSTRACT

Image-shearing apparatus comprises a television camera tube for receiving an optical image from a microscope objective. Electrical circuitry receives the output signal from the camera tube and provides a display image in which a horizontal band is uniformly shifted relative to the remainder of the frame. The amount of lateral shift is adjustable, preferably in a calibrated manner. Then, by registering an edge portion of the image in the shifted band with an adjacent edge portion outside the band, the apparatus may be used with particular advantage in sizing.

16 Claims, 3 Drawing Figures

IMAGE-SHEARING APPARATUS

BACKGROUND OF THE INVENTION

This invention relates to image-shearing apparatus, as used, for example, in sizing instruments.

One of the most important applications of image-shearing apparatus lies in the field of microcircuit manufacture, where image-shearing is used for the precise and accurate measurement of linewidths on semiconductor wafers and the masks used in their production. Image-shearing microscopes are described in United Kingdom Patent Specifications Nos. 910,319; 948,273; 1,285,184 and 1,375,036. An improved split-field image-shearing microscope is described in recent U.S. patent application Ser. No. 060,868. The present invention utilizes the same underlying principle as exploited in the latter application, namely the eye's ability to detect a very small abrupt, step-wise displacement of one segment of a line relative to another immediately abutting segment.

SUMMARY OF THE INVENTION

According to one aspect of the present invention, there is provided an optical image-shearing apparatus comprising a television camera tube for receiving an optical image from a microscope objective and producing an output signal representative of the image, electrical circuitry arranged to receive said output signal and to provide one or more display signals for a television display unit such as to produce on a television display unit an image corresponding to said optical image but in which at least one horizontal band of each frame is uniformly shifted laterally by a selectively variable amount relative to the remainder of each frame.

The apparatus is thus suitable for use in optical sizing apparatus, including the microscope and television display unit. Then, in use, the horizontal band across the screen of the television display unit is made to lie across that section of the image of the object which is to be measured. This can be carried out either by suitably adjusting the position of the object under the microscope or by suitably controlling the height and vertical position of the horizontal band. The image lying on this horizontal band is now displaced laterally in a controlled and calibrated manner until a position is reached where one edge of the object image which lies on the movable horizontal band lines up precisely with the opposing edge of the object image which lies outside the selected horizontal band. The amount of displacement (or shear) of this horizontal band (or split-field) required to bring about this coincidence of the edges of the object image is directly proportional to the width of that object.

In this specification, it should be understood that the term "horizontal" is used in reference to a television display unit oriented in a conventional manner, with the fast scan lines lying horizontal across the screen and the slow frame scan producing the vertical displacement of the scanning television spot.

BRIEF DESCRIPTION OF THE DRAWINGS

To assist in understanding the invention and to show how it may be carried out, an embodiment thereof will now be described, by way of example, with reference to the accompanying diagrammatic drawings, in which.

DETAILED DESCRIPTION OF THE PREFERRED EMBODIMENT

Figure 1:
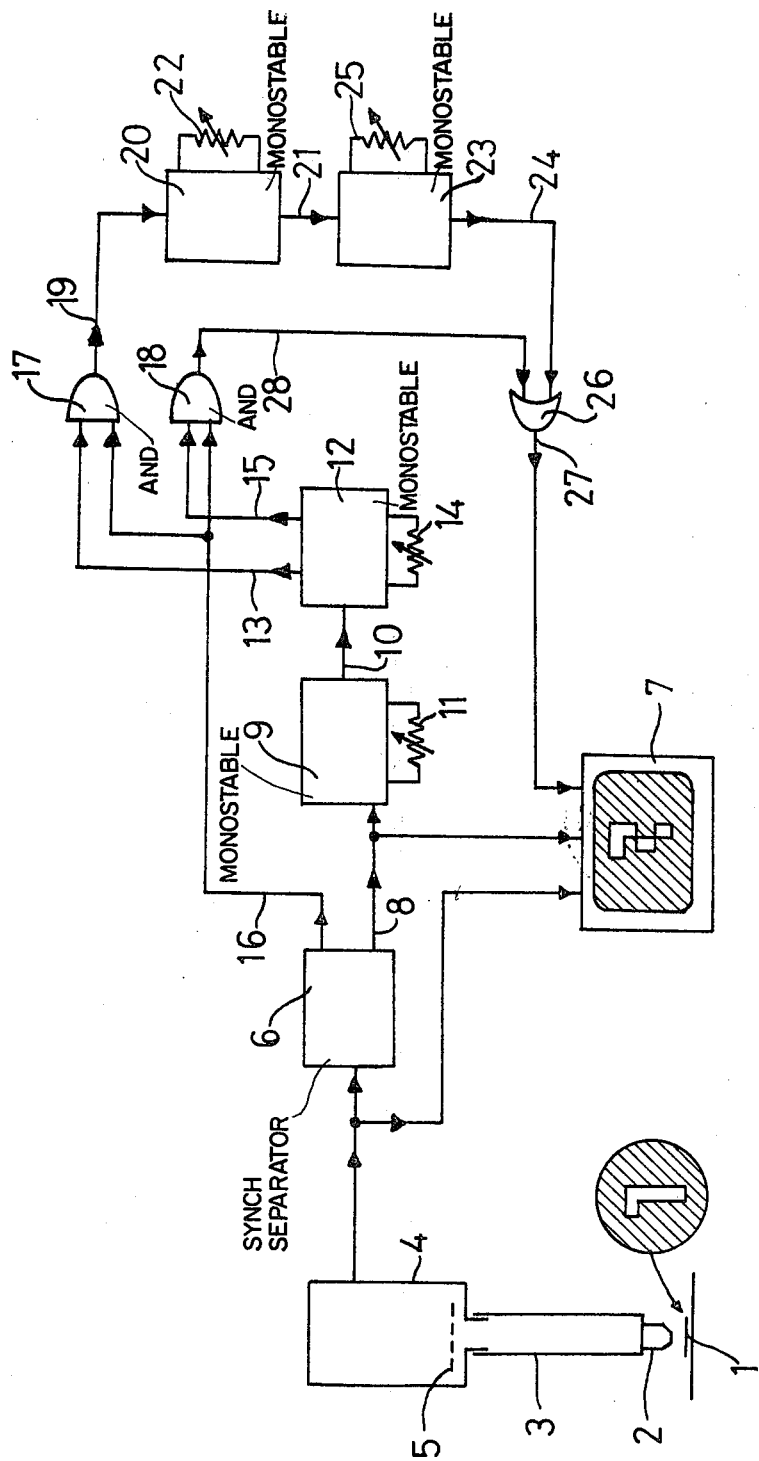
FIG. 1 is a block circuit diagram of an optical sizing apparatus.

In FIG. 1, an object 1, shown to a larger scale in an insert, is positioned beneath a microscope having an objective 2 and a tube 3. The eyepiece of the microscope has been removed and in its place a television camera 4 is fitted in the microscope tube 3, a primary image of the object being formed by the objective 2 on the photocathode 5 of the camera tube. There may alternatively be a reimaging system between the objective and the camera so that a relayed primary image is formed on the photocathode.

The output signal from the television camera is fed to a synch separator circuit 6 which extracts the frame and line synchronizing pulses and also to the video amplifier circuit of the television monitor 7.

Figure 2:
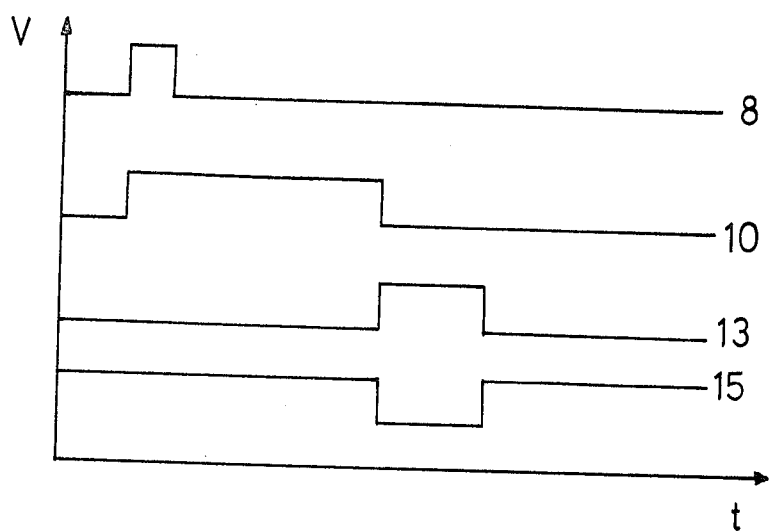
FIGS. 2 and 3 are respective waveform diagrams showing examples of waveforms at various points of the apparatus.

One output of the circuit 6 carries the separated frame synchronizing pulses 8 which are passed to the frame scan circuit of the television monitor 7 and also to a monostable circuit 9. Each frame synchronizing pulse arriving at monostable circuit 9 gives rise to an output pulse 10 from monostable circuit 9 with the time duration of said output pulse controllable by a variable resistance 11. The output pulse 10 from monostable circuit 9 is fed to a second monostable circuit 12 which produces an output pulse 13 initiated by the trailing edge of pulse 10. The time duration of output pulse 13 is adjustable by means of a variable resistance 14. A second output 15 from monostable circuit 12 provides an inverted form of output pulse 13. The relative timing between the frame synchronizing pulses 8 and the output pulses 10, 13 and 15 is illustrated in FIG. 2.

A second output of the circuit 6 carries the line synchronizing pulses 16 which are passed to one input of a dual-input AND gate 17. The other input of AND gate 17 is fed with the pulses 13. A second dual-input AND gate 18 has one of its inputs fed with the line synchronizing pulses 16 and the other of its inputs with the pulses 15. The output pulses 19 from AND gate 17 are fed to a monostable circuit 20. Each pulse arriving at monostable circuit 20 gives rise to an output pulse 21 from monostable circuit 20 with the time duration of said pulse controllable by a variable resistance 22. The output pulse 21 from monostable circuit 20 is fed to another monostable circuit 23 which produces an output pulse 24 initiated by the trailing edge of pulse 21. The time duration of output pulse 24 is adjustable by means of a variable resistance 25. The time duration of pulse 24 is adjusted to be approximately the same as the time duration of the line synchronizing pulses 16.

The output pulses 28 from AND gate 18 are fed to one input of a dual-input OR gate 26 and the pulses 24 are fed to the other input of OR gate 26. The resultant output pulses from OR gate 26 are passed to the line scan circuit of the television monitor 7 as the line synchronizing pulses 27.

Figure 3:
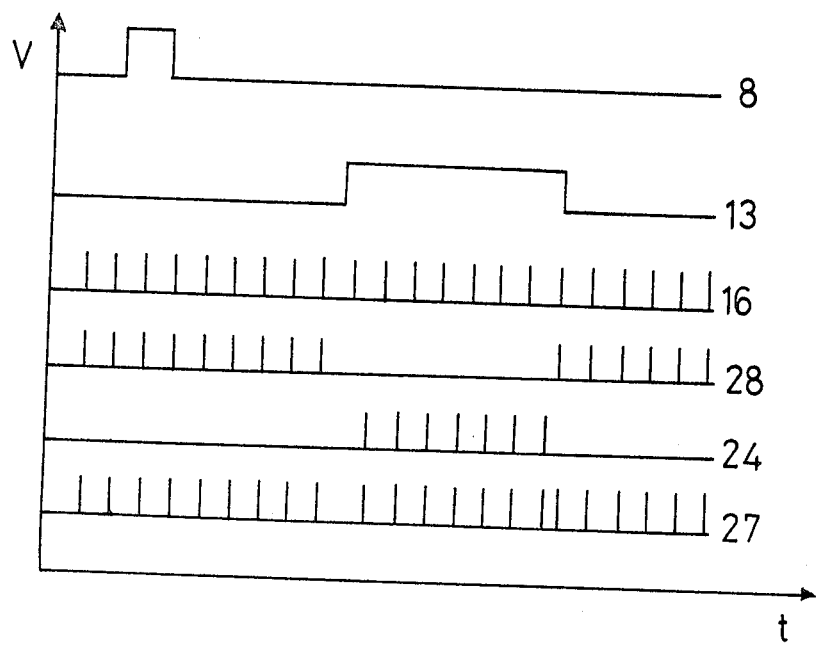

FIG. 3 illustrates the relative timing between the various pulses produced in this circuit arrangement.

In the above arrangement, the line synchronizing pulses from OR gate 26 which occur during the period of pulse 13 are caused to be delayed in time with respect to the original line synchronizing pulses 16, this dealy being adjustable by means of the variable resistance 22. In this way, a horizontal band of the image on the television monitor screen can be displaced laterally to an extent controllable by the variable resistance 22. The vertical position and height of this horizontal band are adjustable by the variable resistances 11 and 14 respectively. The variable resistance 22 can be calibrated to provide a precise means of determining the extent of the lateral displacement of the split image and thereby a precise measure of the width of the object being measured.

Alternatively, the time duration of the output pulse from monostable circuit 20 could be controlled by an adjustable voltage source, the time duration of the output pulse being proportional to the voltage setting. A digital voltmeter could be used to monitor this voltage in order to provide a precise means of measuring the width of the object. Another method would be to monitor the voltage source with an analogue to digital converter, the output of the converter being fed to a suitable read-only memory character generator in order to display the measurement reading directly upon the television display.

The above apparatus requires the edges of the object being measured to be well differentiated from the rest of the object and the background so that the images of opposing edges of the object can be precisely aligned. A preferred method of achieving this differentiation is by the well known optical technique of differential interference contrast. The edges formed around objects on semi-conductor wafers with developed resist patterns when viewed under incident bright-field or dark-field conditions of illumination are also suitable for precise application of the apparatus.

An advantage of the illustrated split-field image-shearing television microscope over purely optical systems is that the video waveform from the television camera can be electronically processed in order to differentiate the edges of the image of the object where optical differentiation is not possible. In this way it is possible to differentiate the edges of the images of line patterns on photo-masks when viewed in transmitted or incident light so that the width of the line patterns can be precisely measured.

An advantage of the illustrated apparatus over filar micrometer television systems such as the Leitz "Latimet" stems from the fact that filar micrometer television systems use an electronically generated filar line which can be moved across the image on the television monitor screen in order to measure the dimensions of objects under the microscope. Such systems suffer from lack of precision due to the effects of vibration on the microscope image causing the image on the television monitor screen to move in relation to the filar line. The illustrated apparatus in effect uses one edge of the object to be measured as a filar line with the result that vibration effects at the microscope do not cause differential movement of the image of the edges of the object on the television monitor screen.

It may be appreciated that the illustrated apparatus may readily be adapted to provide a plurality of horizontal bands with lateral shift.

I claim:

1. Image-shearing apparatus comprising a television camera tube for receiving an optical image from a microscope objective and producing an output signal representative of the image; electrical circuitry coupled to said camera and responsive to the output signal for providing one or more display signals; and at least one television display unit which has a monitor and is coupled to said electrical circuitry and responsive to the one or more display signals to produce on said television monitor an image corresponding to the optical image in which at least one horizontal band of each frame is uniformly shifted laterally by a selectively variable amount relative to the remainder of the frame.

2. Apparatus according to claim 1, including at least a microscope objective for producing the optical image.

3. Apparatus according to claim 1, including means for so electrically processing said output signal as to differentiate edges of said image.

4. Apparatus according to claim 1, including first means for providing calibrated adjustment of lateral shift of the at least one horizontal band.

5. Apparatus according to claim 4, including second means for adjusting height and position of the at least one horizontal band.

6. Apparatus according to claim 4, wherein said electrical circuitry comprises:
first circuitry for extracting frame and line synchronization pulses from the output signal;
second circuitry coupled to said first circuitry and responsive to its output for generating a delay pulse an interval after beginning of each frame synchronization pulse; and
third circuitry coupled to said first and second circuitry and responsive to their outputs for delaying each line synchronization pulse during each delay pulse; and
wherein said first means comprises means for adjusting delay time of the line synchronization pulses.

7. Apparatus according to claim 6, including means for varying duration of the interval and of each delay pulse thereby to adjust respectively the height and position of the at least one horizontal band.

8. Apparatus according to claim 6, wherein said second circuitry comprises a first monostable circuit which is triggered by an edge of each frame synchronisation pulse to produce a respective output pulse and a second monostable circuit which is triggered by the trailing edge of each output pulse from said first monostable circuit to produce a respective delay pulse.

9. Apparatus according to claim 6, wherein said third circuitry comprises a first monostable circuit which is triggered by an edge of each line synchronization pulse to produce a respective output pulse and succeeding second monostable circuit which is triggered by the trailing edge of each output pulse of said first monostable circuit to produce a respective delayed line synchronisation pulse.

10. Apparatus according to claim 6, including gating means for passing to the output of said electrical circuitry delayed line synchronization pulses during each delay pulse and undelayed line synchronization pulses outside each delay pulse.

11. Image-shearing apparatus comprising a television camara tube for receiving an optical image from a microscope objective and producing an output signal representative of the image, and electrical circuitry coupled to said camera and responsive to the output signal for providing one or more display signals for a television display unit such as to produce on a television display unit an image corresponding to the optical image in which at least one horizontal band of each frame is uniformly shifted laterally by a selectively variable amount relative to the remainder of the frame.

12. A method of measuring distance between line elements of an optical image, the method including the steps of forming a television display of an image of an object, uniformly shifting at least one horizontal band of each frame of the television display relative to the remainder of the frame, to form relatively displaced portions of the image in adjacent portions of the field of display, and carrying out calibrated adjustment of the relative displacement of the image portions until a line element of one image portion is brought into alignment with a line element of an image portion in an adjacent portion of the field.

13. A method according to claim 12, including the step of adjusting the height and position of said band.

14. A method according to claim 12, including varying the duration of said interval and of each delay pulse thereby to adjust said height and position respectively of said band.

15. A method according to claim 12 including viewing the object through at least a microscope objective.

16. A method according to claim 12, including the differentiating edges of said image prior to displaying said image.

* * * * *